US012113852B2

(12) United States Patent
Vrcelj et al.

(10) Patent No.: US 12,113,852 B2
(45) Date of Patent: *Oct. 8, 2024

(54) DISTRIBUTION OF APPLICATION COMPUTATIONS

(71) Applicant: QUALCOMM Incorporated, San Diego, CA (US)

(72) Inventors: Bojan Vrcelj, San Diego, CA (US); Prashanth Haridas Hande, San Diego, CA (US); Vinay Melkote Krishnaprasad, Bangalore (IN); Ajit Venkat Rao, San Diego, CA (US); Thomas Stockhammer, Bergen (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/800,890

(22) PCT Filed: Feb. 3, 2021

(86) PCT No.: PCT/US2021/016419
§ 371 (c)(1),
(2) Date: Aug. 18, 2022

(87) PCT Pub. No.: WO2021/178095
PCT Pub. Date: Sep. 10, 2021

(65) Prior Publication Data
US 2023/0108115 A1    Apr. 6, 2023

Related U.S. Application Data

(63) Continuation of application No. 16/810,071, filed on Mar. 5, 2020, now Pat. No. 11,252,226.

(51) Int. Cl.
*H04L 67/1008*    (2022.01)
*H04L 43/0882*    (2022.01)

(52) U.S. Cl.
CPC ...... *H04L 67/1008* (2013.01); *H04L 43/0882* (2013.01)

(58) Field of Classification Search
CPC .. H04L 67/10; H04L 67/1008; H04L 43/0882
See application file for complete search history.

(56) References Cited

U.S. PATENT DOCUMENTS

| 6,385,636 B1 | 5/2002 | Suzuki |
| 6,438,576 B1 | 8/2002 | Huang et al. |

(Continued)

FOREIGN PATENT DOCUMENTS

| CN | 102088472 A | 6/2011 |
| CN | 107274469 A | 10/2017 |

OTHER PUBLICATIONS

International Search Report and Written Opinion—PCT/US2021/016419—ISA/EPO—May 18, 2021.

*Primary Examiner* — Jerry B Dennison
(74) *Attorney, Agent, or Firm* — QUALCOMM Incorporated

(57) ABSTRACT

The present disclosure relates to methods and apparatus for computer processing. Aspects of the present disclosure can determine at least one of a quality, latency, or capacity of a communication link for communication between a client device and a server. Aspects of the present disclosure can also determine a computational load for an application computation between the client device and the server. Moreover, aspects of the present disclosure can adjust a computational distribution for the application computation between the client device and the server based on at least one of the computational load for the application computation or the at least one of the quality, latency, or capacity of the commu- (Continued)

nication link. Aspects of the present disclosure can also determine a computational capacity of at least one of the client device or the server.

26 Claims, 4 Drawing Sheets

(56) References Cited

U.S. PATENT DOCUMENTS

| | | | |
|---|---|---|---|
| 6,473,750 | B1 | 10/2002 | Petculescu et al. |
| 8,250,182 | B2 | 8/2012 | Frank et al. |
| 8,364,751 | B2 | 1/2013 | Meijer et al. |
| 9,491,221 | B1 | 11/2016 | Shropshire |
| 9,576,240 | B2 | 2/2017 | Jeong et al. |
| 10,109,030 | B1 | 10/2018 | Sun et al. |
| 10,650,016 | B2 | 5/2020 | A. C. et al. |
| 10,868,890 | B2 | 12/2020 | Miller et al. |
| 11,252,226 | B2 | 2/2022 | Vrcelj |
| 2007/0067440 | A1* | 3/2007 | Bhogal .......... H04L 67/34 709/224 |
| 2008/0196025 | A1 | 8/2008 | Meijer et al. |
| 2009/0327220 | A1 | 12/2009 | Meijer et al. |
| 2010/0138475 | A1 | 6/2010 | Frank et al. |
| 2010/0272258 | A1 | 10/2010 | Sadovsky et al. |
| 2013/0007088 | A1 | 1/2013 | Alfredo et al. |
| 2013/0138730 | A1 | 5/2013 | Meijer et al. |
| 2014/0274078 | A1 | 9/2014 | Hyde et al. |
| 2016/0154673 | A1 | 6/2016 | Morris |
| 2016/0238852 | A1 | 8/2016 | Ellsworth et al. |
| 2016/0285780 | A1 | 9/2016 | Strijkers et al. |
| 2016/0299956 | A1 | 10/2016 | A. C. et al. |
| 2016/0299957 | A1 | 10/2016 | A. C. et al. |
| 2017/0048876 | A1 | 2/2017 | Mahindra et al. |
| 2017/0064616 | A1 | 3/2017 | Park et al. |
| 2017/0272349 | A1 | 9/2017 | Hopkins et al. |
| 2018/0039519 | A1 | 2/2018 | Kumar et al. |
| 2018/0183855 | A1 | 6/2018 | Sabella et al. |
| 2018/0270531 | A1* | 9/2018 | Ye .......... H04L 43/16 |
| 2018/0308199 | A1* | 10/2018 | Vembu .......... G06F 9/5072 |
| 2018/0336069 | A1 | 11/2018 | Soni |
| 2018/0343321 | A1 | 11/2018 | Chang |
| 2019/0020657 | A1 | 1/2019 | Egner et al. |
| 2019/0041926 | A1 | 2/2019 | Guy et al. |
| 2019/0096023 | A1 | 3/2019 | Diefenbaugh et al. |
| 2019/0158417 | A1 | 5/2019 | Aronovich et al. |
| 2019/0208007 | A1 | 7/2019 | Khalid |
| 2020/0084296 | A1 | 3/2020 | Chang |
| 2020/0234395 | A1* | 7/2020 | Melkote Krishnaprasad .......... G06T 1/20 |
| 2021/0097641 | A1 | 4/2021 | Iyer et al. |
| 2021/0110191 | A1 | 4/2021 | Gruteser et al. |

* cited by examiner

DISTRIBUTION OF APPLICATION COMPUTATIONS

CROSS REFERENCE TO RELATED APPLICATION(S)

This application is National Stage Application filed under 35 U.S.C. § 371 of PCT International Application Serial No. PCT/US2021/016419, entitled "METHODS AND APPARATUS FOR DISTRIBUTION OF APPLICATION COMPUTATIONS" and filed Feb. 3, 2021, which claims priority to and the benefit of U.S. Non-Provisional application Ser. No. 16/810,071, filed Mar. 5, 2020, which are expressly incorporated by reference herein in their entirety.

TECHNICAL FIELD

The present disclosure relates generally to processing systems and, more particularly, to one or more techniques for computer processing.

INTRODUCTION

Computing devices often utilize a graphics processing unit (GPU) or central processing unit (CPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A CPU may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a CPU or GPU of a device is configured to perform the processes in computer or graphics processing. However, with the advent of wireless communication and smaller, handheld devices, there has developed an increased need for improved computer or graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a server, a client device, a central processing unit (CPU), a graphics processing unit (GPU), or any apparatus that can perform computer or graphics processing. The apparatus can determine at least one of a quality, latency, or capacity of a communication link for communication between a client device and a server. The apparatus can also determine a computational load for an application computation between the client device and the server. Additionally, the apparatus can adjust a computational distribution for the application computation between the client device and the server based on at least one of the computational load for the application computation or the at least one of the quality, latency, or capacity of the communication link. In some aspects, the apparatus can determine a computational capacity of at least one of the client device or the server. The apparatus can also determine a thermal threshold level of at least one of the client device or the server. The apparatus can also determine a computational power level of at least one of the client device or the server. The apparatus can also determine whether at least one of the client device or the server supports a minimum computational capacity. Moreover, the apparatus can adjust the computational distribution for the application computation between the client device and the server based on the computational capacity of at least one of the client device or the server. The apparatus can also determine whether the communication link for communication between the client device and the server supports a minimum quality, latency, or capacity level. The apparatus can also measure at least one of the quality, latency, or capacity of the communication link for communication between the client device and the server.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
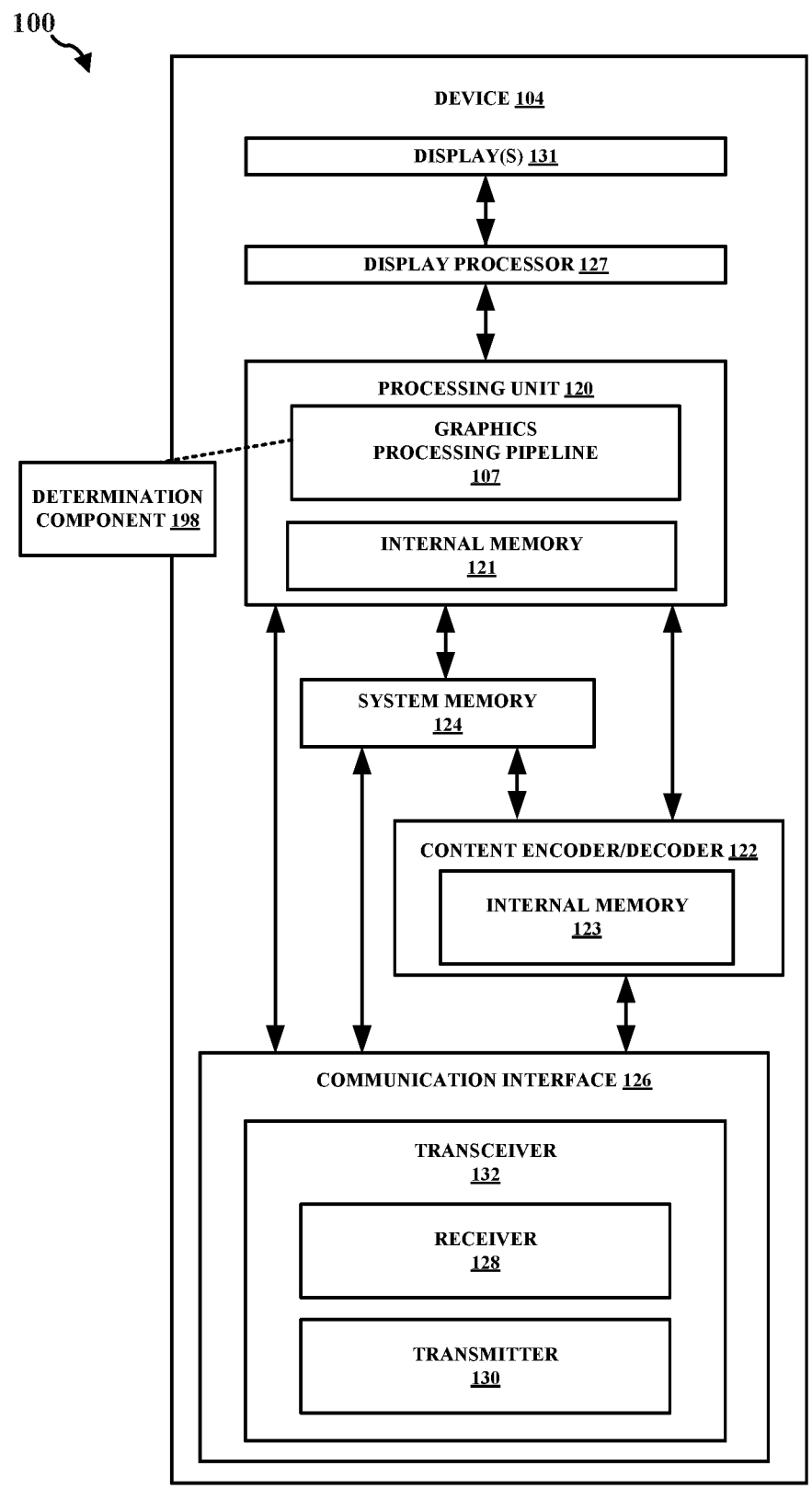
FIG. 1 is a block diagram that illustrates an example content generation system in accordance with one or more techniques of this disclosure.

A mobile device can utilize a significant amount of power when rendering during extended reality (XR), augmented reality (AR), or virtual reality (VR) applications. In order to save power, the rendering architecture may be split or distributed between a server and the client device. Accordingly, it can be advantageous to offload some of the rendering workload to the server in order to save power at the client device. Aspects of the present disclosure can distribute or split the rendering architecture depending on the communication network conditions or quality of service (QoS) level between the server and the client. In some instances, if a certain network, e.g., a 5G network, is producing low latency levels and a high QoS level, then it may be advantageous to offload more of the rendering workload to the server. Also, if the QoS level is low, then it may be advantageous to perform more of the rendering workload at the client device. So the amount of rendering performed by the client or the server may depend on the QoS level between the client and the server. Aspects of the present disclosure can also distribute or split the rendering architecture depending on the computational capacity of the server and/or the client device. Accordingly, aspects of the present disclosure can split the rendering architecture based on a number of different factors in order to: (i) reduce the amount of power utilized locally on the mobile client, (ii) maintain a high level of rendering quality, (iii) maintain a low latency between a head motion and the time when content associated with this motion is displayed on the mobile client, or (iv) optimize the above performance indicators given the mobile device capabilities, current mobile device processing load, current core server load, and the current communication network conditions or QoS.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing.

In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content encoding/decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to determine at least one of a quality, latency, or capacity of a communication link for communication between a client device and a server. The determination component 198 can also be configured to determine a computational load for an application computation between the client device and the server. The determination component 198 can also be configured to adjust a computational distribution for the application computation between the client device and the server based on at least one of the computational load for the application computation or the at least one of the quality, latency, or capacity of the communication link. The determination component 198 can also be configured to determine a computational capacity of at least one of the client device or the server. The determination component 198 can also be configured to determine a thermal threshold level of at least one of the client device or the server. The determination component 198 can also be configured to determine a computational power level of at least one of the client device or the server. The determination component 198 can also be configured to determine whether at least one of the client device or the server supports a minimum computational capacity. The determination component 198 can also be configured to adjust the computational distribution for the application computation between the client device and the server based on the computational capacity of at least one of the client device or the server. The determination component 198 can also be configured to determine whether the communication link for communication between the client device and the server supports a minimum quality, latency, or capacity level. The determination component 198 can also be configured to measure at least one of the quality, latency, or capacity of the communication link for communication between the client device and the server.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component, e.g., a GPU, but, in further embodiments, can be performed using other components, e.g., a CPU, consistent with disclosed embodiments.

In some aspects, the rendering of an image or frame can be performed in multiple locations and/or on multiple devices, e.g., in order to divide the rendering workload between different devices. For example, the rendering workload can be split between a server and a client device. In some aspects, this process can be referred to as "split rendering." In some instances, split rendering can be a method for bringing content to client devices or head mounted displays (HMDs), where a portion of the computer or graphics processing can be performed outside of the client device or HMD, e.g., at a server.

Split rendering can be performed for a number of different types of applications, e.g., virtual reality (VR) applications, augmented reality (AR) applications, and/or extended reality (XR) applications. In VR applications, the content displayed at the client device can correspond to rendered or animated content, e.g., content rendered at a server or client device. In AR or XR applications, a portion of the content displayed at the client device can correspond to real-world content, e.g., objects in the real world, and a portion of the content can be rendered or animated content. Also, the rendered or animated content and real-world content can be displayed in an optical see-through or a video see-through device, such that the user can view real-world objects and rendered content simultaneously. In some aspects, XR content can refer to both VR and AR content. XR, VR, and AR applications can all involve a user viewing rendered content through a headset.

Split rendering can provide a high quality user experience in XR, AR or VR applications by splitting the computational workload between a client or user device, e.g., a HMD or headset, and a server. In some aspects, the client device and the server can be connected to each other via a low-latency communication link, e.g., 5G or Wi-Fi. Also, the server can be located close to the low-latency communication link in order to reduce latency. In some aspects, the server can be referred to as an edge server or a cloud server.

In some instances of XR, VR, and AR applications, a client device or headset can include a GPU or graphics processing device, which can perform the necessary computations or graphics processing for the rendered content. Utilizing split rendering can offload a significant portion of computations or graphics processing to a server. In these instances, the server can be any device that can perform some computations or graphics processing offloaded from the client device. For example, the server can be a cloud server, an edge server, a personal computer, a smart phone, or any appropriate device.

Split rendering can distribute the rendering computations between the server and the client device in a number of different ways. For example, all of the rendering can be performed on the client device, i.e., where all of the computations are performed on the client, and the client shares the computation status with the server. Additionally, all of the rendering can be performed on the server, i.e., where all of the computations are performed on the server, even the images that are to be displayed on the client. In some aspects, in order to reduce the latency in split rendering, some client devices can stream uncompressed video to the server. However, streaming uncompressed video may need a throughput level that is available with certain types of servers.

Split XR, VR, and AR systems can also introduce latency when delivering the rendered content to the client device. In some aspects, this latency can be even higher when rendering occurs on a server than compared to client rendering, but it can also enable more complex XR, VR, and AR content. In addition, there can be non-negligible latency between the time a camera pose is computed and the time the content corresponding to that camera pose appears on the client display. For instance, a certain amount of latency may always be present in split XR, VR, and AR systems.

In some instances of XR, VR, and AR applications, a user may experience dizziness or nausea due to latency issues when observing the XR, VR, or AR content which may not correspond to a user's perceived motion. In order to reduce the potential dizziness or nausea experienced by the user, a client device may need to perform a type of device tracking. This tracking can be performed utilizing a camera or an inertial measurement unit, or a combination of both, and may be performed fully or partially on a CPU, or a GPU, or a digital signal processor (DSP) unit, or a dedicated processing unit. In some aspects, this device pose tracking algorithm can track six degrees of freedom (6DOF), i.e., arbitrary movement in a three dimensional (3D) space. In 6DOF, the relative position of a user's head can be indicated via six numbers. For example, three numbers can define a relative offset or translation, and three numbers can define a relative rotation.

In some instances, the client device can run a 6DOF algorithm to reduce nausea or dizziness. For instance, a client device may reduce the latency in the 6DOF calculation in order to reduce the potential nausea experienced due to a lag between when the motion occurs and when the resulting motion is accounted for in the rendering. For example, if the latency or lag is above a certain threshold, e.g., 25 ms, the user may experience nausea or dizziness. This latency can be the latency experienced between a user movement time and the time when the user motion is properly accounted for in the content displayed on the headset. Further, this 6DOF user pose may need to be accounted for when rendering the content. In split AR or VR applications, the total latency can include the time between the user movement and the moment the content corresponding to this movement is displayed on the headset.

Table 1 below displays a number of different ways in which the computational workload can be split between the server and the client device. For instance, Table 1 displays a client-heavy distribution, a server-heavy distribution, and an even distribution between the server and the client device. In the client-heavy distribution, most operations can be performed by the client device, while diagnostics and game state maintenance can be performed at the server. In the even distribution, time-sensitive and other non-computationally-intensive operations can be performed by the client device, while computationally-heavy and non-time-sensitive operations can be performed at the server. Also, in the server-heavy distribution, time-sensitive and important operations can be performed by the client device, while all other operations can be performed at the server.

TABLE 1

| Mode | Client computations | Server computations |
| --- | --- | --- |
| Client-heavy distribution | Most operations performed by the client device | Mostly diagnostics and game state maintenance performed at the server |
| Even distribution | Time-sensitive and other non-computationally-intensive operations performed by the client device | Computationally-heavy and non-time-sensitive operations performed at the server |
| Server-heavy distribution | Time-sensitive and important operations performed by the client device | All other operations performed by the server |

Figure 2:
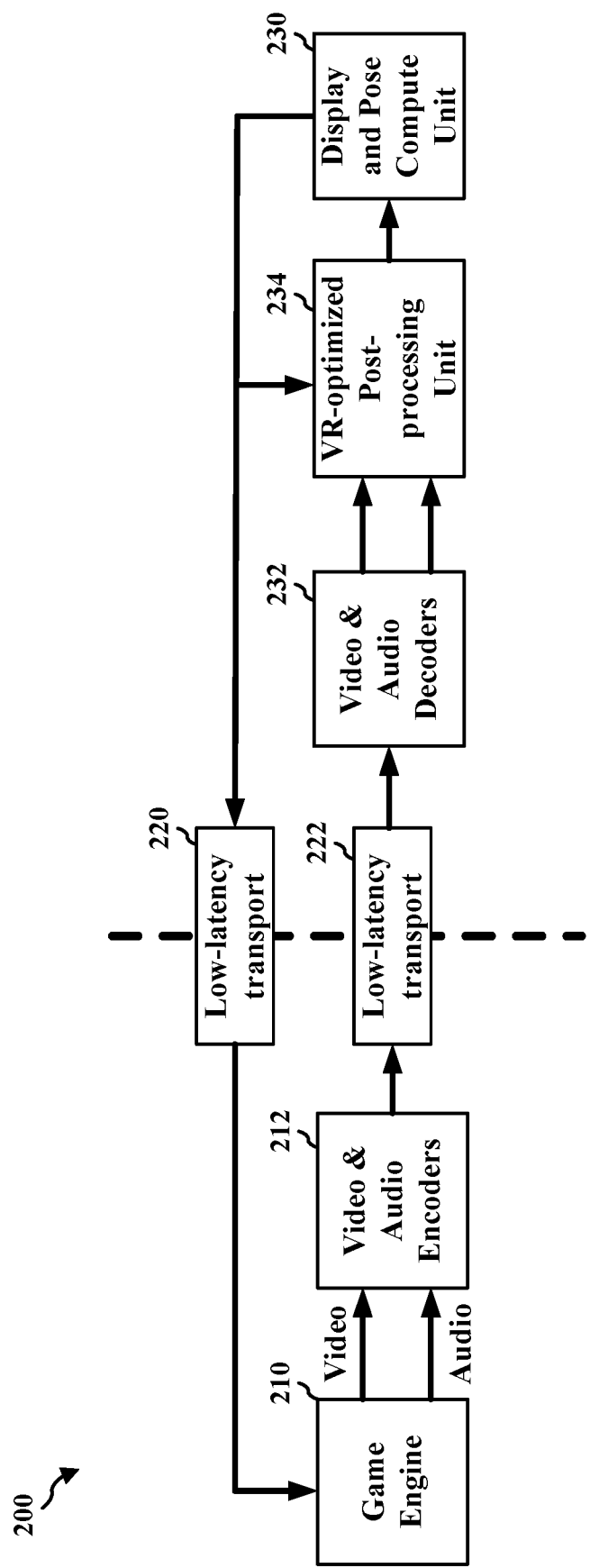
FIG. 2 illustrates an example diagram including communication between a client device and a server in accordance with one or more techniques of this disclosure.

FIG. 2 illustrates a diagram 200 including communication between a client device and a server in accordance with one or more techniques of this disclosure. More specifically, diagram 200 in FIG. 2 is a split rendering architecture in XR, VR, or AR systems. Diagram 200 includes game engine 210, video and audio encoders 212, low-latency transport 220, low-latency transport 222, display and pose compute unit 230, video and audio decoders 232, and VR-optimized post-processing unit 234. In some aspects, display and pose compute unit 230, video and audio decoders 232, and VR-optimized post-processing unit 234 can each be included in an HMD. FIG. 2 displays the information transfer protocol between a client device and a server.

The client device can include the display and pose compute unit 230, video and audio decoders 232, and VR-optimized post-processing unit 234. In some aspects, the display and pose compute unit 230 can generate poses or frames at a high frame rate and upload these poses or frames to the server. Also, the server can include the game engine 210 and video and audio encoders 212. The game engine 210 can be an application that produces a frame taken from a certain viewpoint, e.g., a room, which can be dependent on the pose from the client device. In some instances, each item in a frame can be rendered, e.g., each item in a room.

In some aspects, the game engine 210 can render multiple eye-buffers, where each eye-buffer represents a unique perspective captured on the client. These eye-buffers can be encoded as video. Also, these eye-buffers, as well as the corresponding audio content, can be sent from the game engine 210 to the video and audio encoders 212, which can compress the stream or information and send it downlink to the client device, e.g., via the low-latency transport 222. The client device can decompress the stream or information, e.g., using the video and audio decoders 232, and then perform the post-processing at VR-optimized post-processing unit 234.

During the post-processing, the client device can perform lens distortion correction (LDC) and/or chrome aberration correction (CAC), which can correct the distortion introduced by an HMD lens. For example, the game engine on the server can produce an undistorted video, but the lens in the HMD can introduce a barrel distortion to extend the field of view (FOV), e.g., extend the FOV from 30 degrees to 90 degrees. This barrel distortion may need to be corrected, so that the resulting images look "natural" to the viewer. The correction may be introduced by mappings encoded in the LDC and/or CAC, e.g., so that resulting pincushion-distorted images look natural to the viewer when viewed through the HMD lens.

In some aspects, the post-processing can be performed using a time warp, which can hide the latency from other steps in the process. This latency can result from the information sent round trip from the client device to the server and back to the client device. This round trip information transfer can be referred to as motion-to-render-to-photon (M2R2P). M2R2P can include motion from the display and pose compute unit 230, to rendering on the server, to a photon or display on the display and pose compute unit 230. As mentioned above, this can produce a latency between the time of user movement and the time a user views the resulting motion on the headset. In some instances, without the use of split rendering, this latency can be too long for user comfort. For instance, the post-processing and time warp can produce a long delay, e.g., greater than 50 ms, which may cause the user to experience nausea or dizziness. The time warp can be a re-projection of an image or frame.

As mentioned herein, eye-buffers can be sent from the server to the client device, and then the eye-buffers can be re-projected to correspond to a later pose. In some aspects, the later pose can be estimated in the display and pose compute unit 230 and applied in the post-processing unit 234. So the client device can take a later pose and use this later pose to re-project the eye-buffers that are sent downlink from the server. In some aspects, the latency for the total round trip information transfer, e.g., 50 ms, can be greater than the latency for this eye-buffer re-projection loop, e.g., 15 ms, and the end-user perceived latency can be equal to that of the re-projection loop, e.g., 15 ms.

In some instances, as long as the communication link between the server and the client device is adequate, then the latency can stay below certain latency thresholds. For example, based on the combination of components and steps shown in FIG. 2, e.g., the low latency transport and re-projection during post-processing, a server can be located in a number of different locations that are remote from the client device if the communication link is adequate. It is noted that the quality of the communications link, e.g., determined by standard parameters such as transmitted power, channel geometry, or relative interference, may be one of many reasons as to why the latency may be high. For instance, as the server may not be co-located with a base station the wireless communication link latency can be higher than traditional link latency.

In some aspects, when a user launches an XR, AR, or VR application on a client device, a session setup protocol can setup an application session. This can occur after checking the availability of the server and low-latency communication link resources. If the server and low-latency communication link resource availability is not checked, and is assumed to be adequate, then the user experience may suffer. In some aspects, the user experience may be worse if the server availability is not even checked, but assumed to be adequate.

Additionally, the client device or HMD can utilize a significant amount of power when rendering during XR, AR, or VR applications. As the client device can utilize a lot of power when rendering, it may be advantageous to split the rendering architecture between the server and the client device. By doing so, client devices may be able to reduce the amount of power utilized during XR, AR, or VR applications. Accordingly, there is a present need to offload some of the rendering architecture from the client device to the server during XR, AR, or VR applications.

Aspects of the present disclosure can distribute or split the rendering load between the server and the client device by offloading some of the rendering workload to the server. In some instances, this can depend on the communication network conditions between the server and the client. Other factors which may help to determine how much of the rendering load is undertaken on the mobile client versus launched on the remote server are: battery power available on the device, an estimate of the mobile modem power needed to maintain a minimum QoS, the combined cost of engaging the server rendering load, e.g., the infrastructure cost passed on to the user. For instance, aspects of the present disclosure can split the rendering workload between the client device and the server in order to reduce the amount of power utilized at the client device. Additionally, it can be advantageous to offload some of the rendering workload to the server whenever the server is available and the combined network and communication link between the sever and the client allows for low-latency transport.

In some aspects, the communication network condition can be referred to as a quality of service (QoS) level. In some instances, if a certain network, e.g., a 5G network, is producing low latency levels and/or a high QoS level, then it may be advantageous to offload more of the rendering workload to the server. In some aspects, a number of factors can contribute to the QoS level, e.g., the packet error rate (PER) or the block error rate (BLER). Additionally, in some aspects, the QoS levels of the communication link may be a combination of the PER or BLER and the latency level. Also, if the QoS level is low, then it may be advantageous to perform more of the rendering workload at the client device. So the amount of rendering performed by the client or the server may depend on the QoS level between the client and the server. Aspects of the present disclosure can also distribute or split the rendering architecture depending on computational capacity of the server and/or the client device.

As indicated above, varying the rendering architecture depending on the communication network conditions can help to save power at the client device or HMD. Accordingly, if the network condition or QoS level is good, then not as much power may be needed at the client device, as the server can perform more of the rendering workload. In contrast, if the QoS level is poor, so the server will be unable to handle a significant portion of the rendering workload, then the client device may need to perform more of the rendering workload.

As indicated herein, the amount of computations or rendering offloaded to the server can be dependent on the QoS level or latency, e.g., M2R2P latency, in the communication link between the client and the server. Also, the more rendering functions that are performed on the server, the simpler the post-processing can be at the client device.

In some aspects, the client may perform a minimum amount of functions, even when the QoS level is high and the computational distribution is server-heavy. For example, the client device can perform a 6DOF pose, decode content, and/or perform an asynchronous time warping (ATW) or other types of optimized post-processing when the QoS level is high. Also, if the XR experience includes the use of hand-held controllers or other interactivity peripherals, the HMD can combine the information from these peripherals with the 6DOF pose information and send both on the uplink channel to the server. So the client device should be able to handle the pose for the user, as well as some level of post-processing.

Additionally, the amount of computations performed at the server can be dependent on the QoS level. For instance, the game engine may run on the server, but the server can also perform environment detection and understanding, in systems or experiences which may need this service. Environment understanding can for example entail detecting and understanding real world objects in the physical space around or in front of the user, e.g., their shapes, sizes, and position in the physical world. So if the QoS level is high, and the client device determines that performing the environment understanding locally is outside of its capabilities or the load computation is too high, it can send images or real world objects to the server.

Also, the server can compute several game engine rendering functions, e.g., visibility computations, shading, special effects, ray-tracing, or physics engine computations, all of which may need a lot of computational workload. For example, during a visibility stage, the visibility of different meshes in a scene can be determined, which is a computationally intense step. Also, determining the shading for a scene is a computationally intense step, especially in the presence of multiple and dynamic light sources, indirect lighting or global illumination, glossy materials, particles in the light transport medium, etc. A physics engine can determine the different physical attributes for objects in a scene, e.g., how a ball will bounce off different objects. Moreover, the server can perform collaborative gaming services, where it can determine a user state and/or inform the client device of the next object to render. In some instances, in a client-heavy computation, most of the rendering can be performed on the client device, and the server can provide the game state information.

The QoS level can also correspond to the latency of the communication network and/or the reliability of the communication network. As such, the latency and the reliability of the network can be directly related. For example, a client device may function properly when a certain percentage of communication is transferred reliably, which can cause the latency level to increase. Accordingly, if a communication is sent at a certain rate with a high reliability, this can result in a higher latency. And if a communication is sent at a lower rate with a low reliability, this can result in a lower latency.

In some aspects, if the QoS level is determined to be low, e.g., detected on an application on the client device, then the communication may be switched to a client-heavy mode. Also, if the round trip latency is high, then latency sensitive operations can be performed on the client device. This trade-off can be determined at the time when the service is initiated or negotiated, so that the computational load in the rendering pipeline can be determined.

In some aspects, the QoS level can be evaluated when the communication is initially setup between the client device and the server. In some instances, the QoS level can also be evaluated periodically at certain time intervals, e.g., every 10 or 15 minutes, for communication between the server and the client device. Additionally, in some aspects, the QoS level between the server and the client device can be evaluated continuously.

As mentioned above, when a user launches an application on the client device, a session setup protocol can setup the application session after checking the availability of the server and low-latency communication link resources. Aspects of the present disclosure can make decisions regarding the distribution of the computational workload between the client device and the server during the setup of the application session. In some aspects, the present disclosure can perform the session setup and assess the performance of the communication link at the application level, e.g., via feedback from the application on the client device or the application on the server. In some instances, the server may be available, but there may be many users requesting the assistance from the same server, e.g., when the compute center is an edge server. In these cases, the server can also decline service or can provide service to premium tear users, e.g., at premium charges. The application can then adapt to the current conditions of the communication link between the client device and the server.

Aspects of the present disclosure can also include an AR application session setup that checks for the availability of the server and low-latency communication link resources. If the resources are not available, a decision can be taken to run most of the computations on the client device. Accordingly, the present disclosure can adjust the computational distribution based on a number of different factors, such as the QoS level of the communications link, the available resources on the client device, the available resources on the server, and/or the resulting operations cost of server-heavy distribution.

Aspects of the present disclosure can include a number of different ways in which to distribute the computational workload between the client device and the server. Table 2 below displays several of these modes for distributing the computational workload. For instance, Table 2 displays a client-heavy workload distribution, a server-heavy workload distribution, and an equal workload distribution. Table 2 also shows the client device computations, the server computations, the uplink traffic, and the downlink traffic.

TABLE 2

| Mode | Client computations | Server computations | Uplink traffic | Downlink traffic |
| --- | --- | --- | --- | --- |
| Client-heavy distribution | 6DOF pose tracking, environment sensing, game | Collaborative gaming services (multi-user play and mapping), | Game state, 6DOF pose and mapping parameters | Game assets, game state in multi-user games, maps |

TABLE 2-continued

| Mode | Client computations | Server computations | Uplink traffic | Downlink traffic |
|---|---|---|---|---|
| | engine rendering, ATW | location-dependent asset procurement and transport | | and supporting material |
| Equal distribution | 6DOF tracking, low level perception (human body perception, geometric primitives, feature descriptors, etc.), low grade game engine instance for partial content rendering, content decoding, ATW, content compositing | Higher level perception (semantic segmentation, object classification, precise object shape or location, and object-level mapping), game engine instance focused on certain aspects (physically-based rendering, materials, particle effects, etc.) | Game state, 6DOF pose, perception primitives (skeletal information, geometric primitives, feature descriptors, etc.) | Environment-adapted rendered content (rendering parameters dependent on environment) sent as impostors, meshes and shaded textures, etc. |
| Server-heavy distribution | 6DOF tracking, content decoding, ATW, content compositing | Environment detection and understanding, game engine rendering (visibility computation, shading, ray-tracing, special effects, physics engine), content encode | HMD 6DOF pose, controller poses and states, HMD-mounted camera feed | Environment-adapted rendered content (rendering parameters dependent on environment) sent as frames, impostors, etc. |

As shown in Table 2 above, in aspects of the present disclosure including a client-heavy distribution, the client device can compute the 6DOF pose tracking, the environment sensing, the game engine rendering, and/or the ATW or other specialized post-processing. Additionally, in a client-heavy distribution, the server can compute the collaborative gaming services, e.g., multi-user play and mapping, the location-dependent asset procurement, and/or the transport. The uplink traffic in a client-heavy distribution can include the game state, the 6DOF pose, and/or the mapping parameters. Also, the downlink traffic in a client-heavy distribution can include certain game assets, the game state of all users in multi-user games, maps, and/or supporting material.

As further shown in Table 2 above, in aspects of the present disclosure including an equal distribution, the client device can compute the 6DOF tracking, the low level perception, e.g., human body perception, geometric primitives, feature descriptors, etc. The client can also instantiate and execute a low grade game engine instance for partial content rendering. Also, the client can be responsible for content decoding, the ATW, and/or other post-processing, and the content compositing, when applicable. In an equal distribution, the server can compute the higher level perception, e.g., the semantic segmentation, object classification, precise object shape or location, and object-level environment mapping, and/or the game engine instances focused on certain aspects, e.g., the physically-based rendering, materials, particle effects, etc. The uplink traffic in an equal distribution can include the game state, the 6DOF pose, and/or the perception primitives, e.g., the skeletal information, geometric primitives, feature descriptors, etc. Moreover, the downlink traffic in an equal distribution can include the environment-adapted rendered content, e.g., rendering parameters dependent on environment, which can be sent as impostors, meshes, and/or shaded textures.

In addition, as shown in Table 2 above, in aspects of the present disclosure including a server-heavy distribution, the client device can compute the 6DOF tracking, the content decoding, the ATW, other types of optimized post-processing, and/or the content compositing. In a server-heavy distribution, the server can compute the environment detection and understanding, the game engine rendering, e.g., the visibility computation, shading, ray-tracing, special effects, and physics engine, and/or the content encoding. The uplink traffic in a server-heavy distribution can include the HMD 6DOF pose, the controller poses and states, and/or the HMD-mounted camera feed. Further, in a server-heavy distribution, the downlink traffic can include the environment-adapted rendered content, e.g., the rendering parameters dependent on environment, which can be sent as frames and/or impostors.

In some aspects, if an AR, VR, or XR application session setup infers that the underlying communication link cannot support a minimum QoS level, then the session can proceed where most of the computation is performed locally, i.e., a local or client-heavy application. This can be accomplished by assessing the QoS level, e.g., if there are minimum QoS levels for certain levels of computational splits. As such, the present disclosure can assess the QoS level based on the level of computational split.

Additionally, if an AR, VR, or XR application session setup infers that the server cannot support the minimum computational capacity, then the session can proceed where most of the computation is performed locally, i.e., a local or client-heavy application. Also, the client device can report to the server concerning the client device computational capabilities. At least some instances of server/client computation split decisions according to the present disclosure can include: (i) local compute capabilities, e.g., at the client, given the current load, (ii) remote compute capabilities, e.g., at the server, given the current load, (iii) local and remote capabilities given thermal considerations at the time, (iv) communication link considerations including QoS and/or end-to-end combined average link latency under minimum acceptable QoS, (v) client battery life considerations given local rendering options, e.g., low communications specifications, or remote rendering options, e.g., low local rendering specifications.

In some aspects, the AR, VR, or XR application can use the communication link to exchange application information with a server or another AR, VR, or XR application client device, e.g., a game information exchange. Also, the AR, VR, or XR application can use the communication link to the server to transfer the input and output of certain functions with computations that can be offloaded to the server. For example, the server can perform certain computationally-intense functions, e.g., ray-tracing, or physics engine computations.

In some instances, the AR, VR, or XR application can use the communication link to exchange application information with a server or another AR, VR, or XR application client device, e.g., a game information exchange. Additionally, in some aspects, the AR, VR, or XR application session setup can infer if a reduced communication level is supported by the communication link, and if supported, the session can proceed with a version of the AR, VR, or XR application that is no more than the reduced level of communication link. Moreover, in some aspects, the AR, VR, or XR application session setup can infer if a reduced QoS level or capacity is supported by the server, and if supported, the session can proceed with a version of the application that is no more than the reduced QoS level or server capacity. As such, the QoS level can be determined by the communication device and/or the amount of time spent to communicate.

In some aspects, the computational split or distribution can be determined based on the communication link between the server and the client device. This can be determined based on the amount of supported throughput, as well as the average latency of transporting an information group needed for creating the next device's refresh content, e.g., frame, on the mobile client. Moreover, the computational split or distribution can be determined based on the computational capacity of the server and/or the computational capacity of the client device. For example, the computational split can be determined based on the computational capacity of the server and/or the cost of a computation on the server. Also, the computational split can be determined based on the computational capacity of the client device and/or the amount of power a computation may need on the client device. Accordingly, the computational split or distribution can be determined based on a number of different factors.

Figure 3:
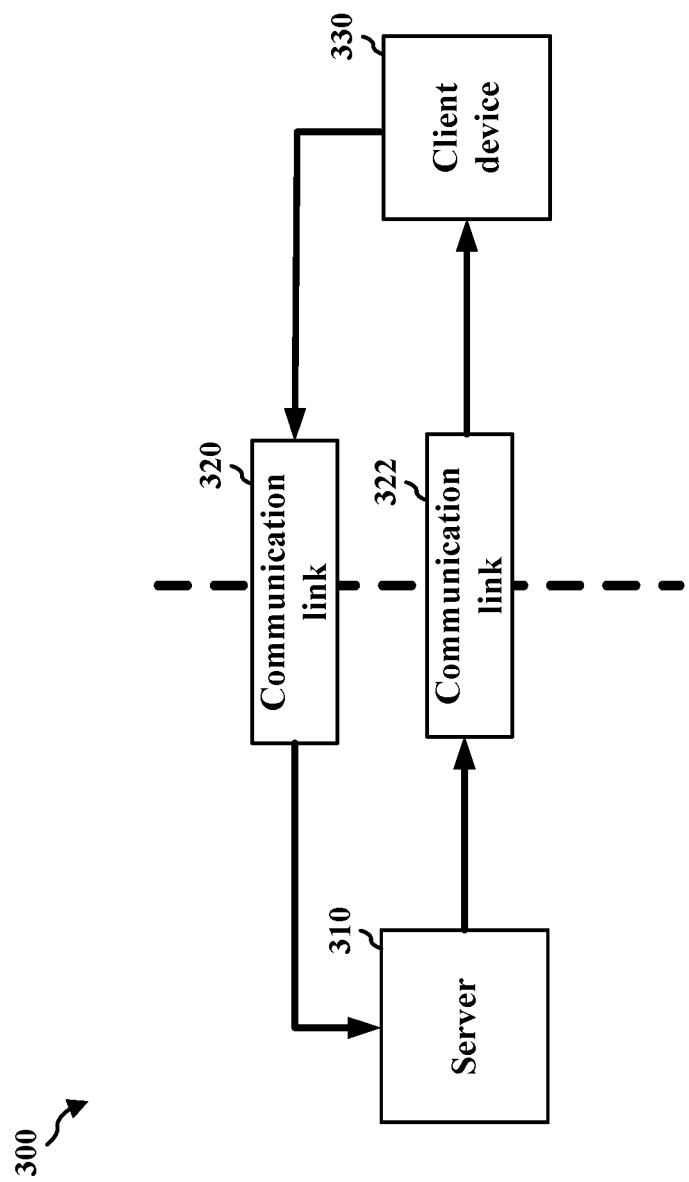
FIG. 3 illustrates an example diagram including communication between a client device and a server in accordance with one or more techniques of this disclosure.

FIG. 3 illustrates a diagram 300 including communication between a client device and a server in accordance with one or more techniques of this disclosure. As shown in FIG. 3, diagram 300 includes server 310, communication link 320, communication link 322, and client device 330. In some aspects, the server 310 can include a game engine and/or video and audio encoders. Also, client device 330 can include an HMD or headset, video and audio decoders, and/or a VR-optimized post-processing unit. Further, the communication links 320 and/or 322 can include a low-latency transport.

FIG. 3 illustrates an example of the aforementioned processes for distributing application computations between a client device and a server in split rendering. As shown in FIG. 3, aspects of the present disclosure, e.g., servers and client devices herein, can perform a number of different steps or processes to distribute the application computations. For instance, servers and client devices herein can determine at least one of a quality, latency, or capacity of a communication link for communication between a client device, e.g., client device 330, and a server, e.g., server 310.

Servers and client devices herein can also determine a computational load for an application computation between the client device, e.g., client device 330, and the server, e.g., server 310. Also, servers and client devices herein can determine whether the communication link, e.g., communication link 320 or communication link 322, for communication between the client device, e.g., client device 330, and the server, e.g., server 310, supports a minimum quality, latency, or capacity level.

Servers and client devices herein can also measure at least one of the quality, latency, or capacity of the communication link for communication between the client device, e.g., client device 330, and the server, e.g., server 310. In some aspects, the measurement of the quality, latency, or capacity of the communication link for communication between the client device, e.g., client device 330, and the server, e.g., server 310, can be based on XR applications, AR applications, or VR applications. Also, the measurement of the quality, latency, or capacity of the communication link for communication between the client device, e.g., client device 330, and the server, e.g., server 310, can be initiated by the client device, e.g., client device 330, and/or the server, e.g., server 310.

Moreover, servers and client devices herein can determine a computational capacity of at least one of the client device, e.g., client device 330, or the server, e.g., server 310. Servers and client devices herein can also determine a thermal threshold level of at least one of the client device, e.g., client device 330, or the server, e.g., server 310. Servers and client devices herein can also determine a computational power level of at least one of the client device, e.g., client device 330, or the server, e.g., server 310. In some aspects, the computational power level of the client device, e.g., client device 330, can include a remaining battery level.

Servers and client devices herein can also determine whether at least one of the client device, e.g., client device 330, or the server, e.g., server 310, supports a minimum computational capacity. In some aspects, the computational capacity of at least one of the client device, e.g., client device 330, or the server, e.g., server 310, can be a computational capacity for XR applications, AR applications, or VR applications. Also, the computational capacity of at least one of the client device, e.g., client device 330, or the server, e.g., server 310, can be a rendering computational capacity.

Additionally, servers and client devices herein can adjust a computational distribution for the application computation between the client device, e.g., client device 330, and the server, e.g., server 310, based on at least one of the computational load for the application computation or the at least one of the quality, latency, or capacity of the communication link. Also, servers and client devices herein can adjust the computational distribution for the application computation between the client device, e.g., client device 330, and the server, e.g., server 310, based on the computational capacity of at least one of the client device or the server.

In some aspects, the client device, e.g., client device 330, can perform a first client level of the application computation and the server, e.g., server 310, can perform a second server level of the application computation when the determined computational load for the application computation is less than a computational load threshold. Also, the client device, e.g., client device 330, can perform a second client level of the application computation and the server, e.g., server 310, can perform a first server level of the application computation when the determined computational load for the application computation is greater than or equal to a computational load threshold. The client device can also perform a third client level of the application computation and the server can perform a third server level of the application computation when the determined computational load for the application computation is approximately equal to a computational load threshold.

In some aspects, the computational distribution for the application computation between the client device, e.g., client device 330, and the server, e.g., server 310, can correspond to a split XR architecture, a split AR architecture, or a split VR architecture. Additionally, the server, e.g., server 310, can be an edge server or a cloud server. The client device, e.g., client device 330, can also be a head mounted display (HMD) or a headset. Further, the computational distribution for the application computation between the client device, e.g., client device 330, and the server, e.g., server 310, can be adjusted by a central processing unit (CPU) or a graphics processing unit (GPU).

In some aspects, the quality, latency, or capacity of the communication link, e.g., communication link 320 or communication link 322, may be determined based on a quality of service (QoS) notification message. This QoS notification message may be received from a wireless communication system, e.g., an NR system or an LTE system. Also, the computational distribution may be adjusted based on the QoS notification message. Additionally, a time period of adjustment of the computational distribution may be based on the QoS notification message. In some instances, the time period of adjustment may be at least a certain time period, e.g., at least 100 ms. Moreover, the application computation may be for multimedia applications. For example, the multimedia applications may include at least one of XR applications, AR applications, VR applications, cloud gaming applications, or cloud assisted perception applications.

Figure 4:
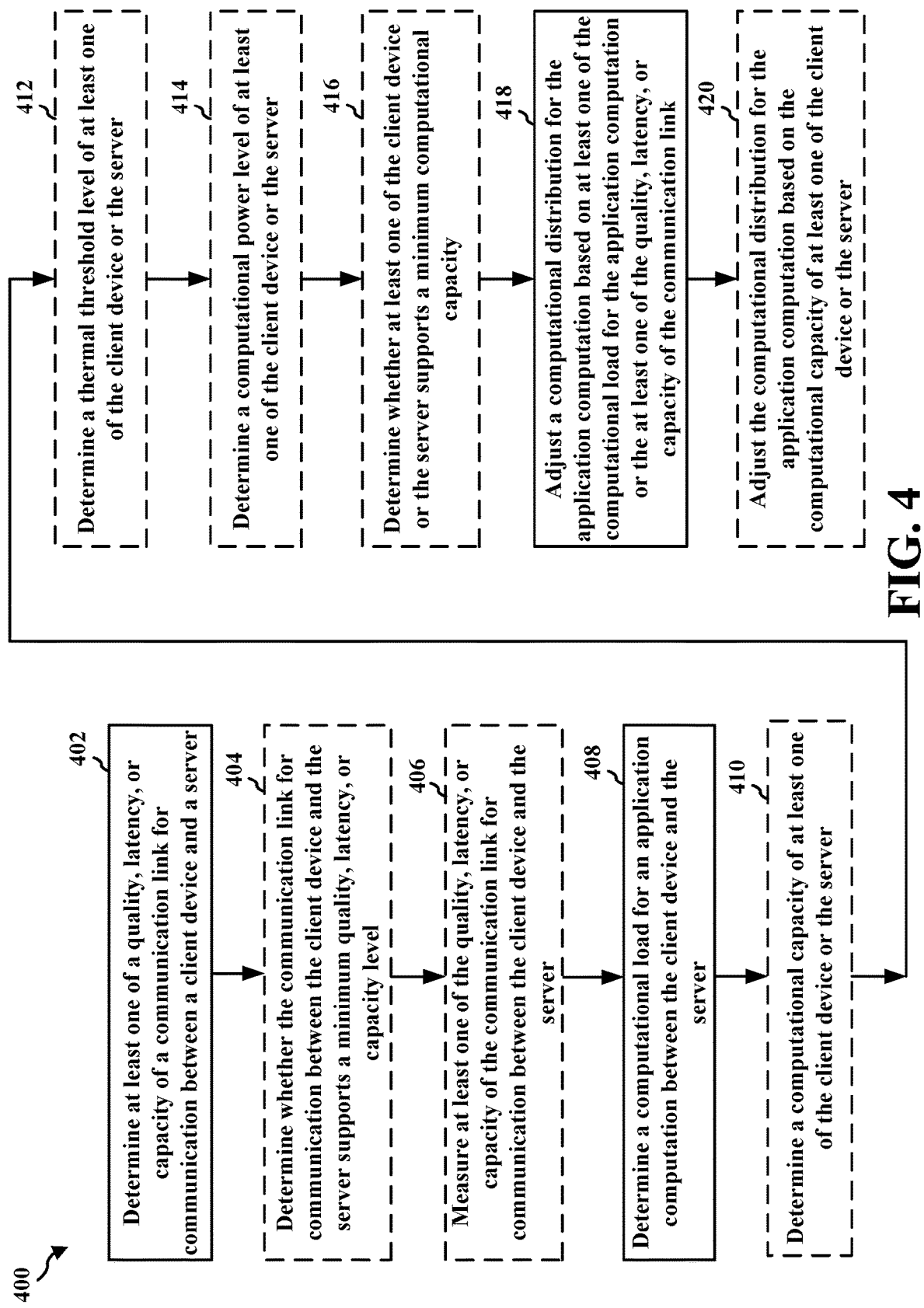
FIG. 4 illustrates an example flowchart of an example method in accordance with one or more techniques of this disclosure.

FIG. 4 illustrates an example flowchart 400 of an example method in accordance with one or more techniques of this disclosure. The method may be performed by an apparatus such as a server, a client device, a CPU, a GPU, or an apparatus for computer or graphics processing. At 402, the apparatus may determine at least one of a quality, latency, or capacity of a communication link for communication between a client device and a server, as described in connection with the examples in FIGS. 2 and 3. At 404, the apparatus may determine whether a communication link for communication between the client device and the server supports a minimum quality, latency, or capacity level, as described in connection with the examples in FIGS. 2 and 3.

At 406, the apparatus may measure at least one of the quality, latency, or capacity of the communication link for communication between the client device and the server, as described in connection with the examples in FIGS. 2 and 3. In some aspects, the measurement of the quality, latency, or capacity of the communication link for communication between the client device and the server can be based on XR applications, AR applications, or VR applications, as described in connection with the examples in FIGS. 2 and 3. Also, the measurement of the quality, latency, or capacity of the communication link for communication between the client device and the server can be initiated by the client device and/or the server, as described in connection with the examples in FIGS. 2 and 3.

At 408, the apparatus may determine a computational load for an application computation between the client device and the server, as described in connection with the examples in FIGS. 2 and 3. At 410, the apparatus may determine a computational capacity of at least one of the client device or the server, as described in connection with the examples in FIGS. 2 and 3. At 412, the apparatus may determine a thermal threshold level of at least one of the client device or the server. At 414, the apparatus may determine a computational power level of at least one of the client device or the server. In some aspects, the computational power level of the client device can include a remaining battery level.

At 416, the apparatus may also determine whether at least one of the client device or the server supports a minimum computational capacity, as described in connection with the examples in FIGS. 2 and 3. In some aspects, the computational capacity of at least one of the client device or the server can be a computational capacity for XR applications, AR applications, or VR applications, as described in connection with the examples in FIGS. 2 and 3. Also, the computational capacity of at least one of the client device or the server can be a rendering computational capacity, as described in connection with the examples in FIGS. 2 and 3.

At 418, the apparatus may adjust a computational distribution for the application computation between the client device and the server based on at least one of the computational load for the application computation or the at least one of the quality, latency, or capacity of the communication link, as described in connection with the examples in FIGS. 2 and 3. At 420, the apparatus may also adjust the computational distribution for the application computation between the client device and the server based on the computational capacity of at least one of the client device or the server, as described in connection with the examples in FIGS. 2 and 3.

In some aspects, the client device can perform a first client level of the application computation and the server can perform a first server level of the application computation when the determined computational load for the application computation is less than a computational load threshold, as described in connection with the examples in FIGS. 2 and 3. Also, the client device can perform a second client level of the application computation and the server can perform a second server level of the application computation when the determined computational load for the application computation is greater than or equal to a computational load threshold, as described in connection with the examples in FIGS. 2 and 3. Also, the client device can perform a third client level of the application computation and the server can perform a third server level of the application computation when the determined computational load for the application computation is approximately equal to a computational load threshold, as described in connection with the examples in FIGS. 2 and 3.

In some aspects, the computational distribution for the application computation between the client device and the server can correspond to a split XR architecture, a split AR architecture, or a split VR architecture, as described in connection with the examples in FIGS. 2 and 3. Additionally, the server can be an edge server or a cloud server, as described in connection with the examples in FIGS. 2 and 3. The client device can also be a HMD or a headset, as described in connection with the examples in FIGS. 2 and 3. Further, the computational distribution for the application computation between a client device and a server can be adjusted by a CPU or a GPU, as described in connection with the examples in FIGS. 2 and 3. In some aspects, the quality or load level can includes a quality of service (QoS) level, as described in connection with the examples in FIGS. 2 and 3.

In some aspects, the quality, latency, or capacity of the communication link may be determined based on a quality of service (QoS) notification message, as described in connection with the examples in FIGS. 2 and 3. This QoS notification message may be received from a wireless communication system, e.g., an NR system or an LTE system, as described in connection with the examples in FIGS. 2 and 3. Also, the computational distribution may be adjusted based on the QoS notification message, as described in connection with the examples in FIGS. 2 and 3. Additionally, a time period of adjustment of the computational distribution may be based on the QoS notification message, as described in connection with the examples in FIGS. 2 and 3. In some instances, the time period of adjustment may be at least a certain time period, e.g., at least 100 ms, as described in connection with the examples in FIGS. 2 and 3. Moreover, the application computation may be for multimedia applications, as described in connection with the examples in FIGS. 2 and 3. For example, the multimedia applications may include at least one of XR applications, AR applications, VR applications, cloud gaming applications, or cloud assisted perception applications, as described in connection with the examples in FIGS. 2 and 3.

In one configuration, a method or apparatus for graphics processing is provided. The apparatus may be a server, a client device, a CPU, a GPU, or some other processor that can perform computer or graphics processing. In one aspect, the apparatus may be the processing unit 120 within the device 104, or may be some other hardware within device 104 or another device. The apparatus may include means for determining at least one of a quality, latency, or capacity of a communication link for communication between a client device and a server. The apparatus may also include means for determining a computational load for an application computation between the client device and the server. The apparatus may also include means for adjusting a computational distribution for the application computation between the client device and the server based on at least one of the computational load for the application computation or the at least one of the quality, latency, or capacity of the communication link. The apparatus may also include means for determining a computational capacity of at least one of the client device or the server. The apparatus may also include means for determining a thermal threshold level of at least one of the client device or the server. The apparatus may also include means for determining a computational power level of at least one of the client device or the server. The apparatus may also include means for determining whether at least one of the client device or the server supports a minimum computational capacity. The apparatus may also include means for adjusting the computational distribution for the application computation between the client device and the server based on the computational capacity of at least one of the client device or the server. The apparatus may also include means for determining whether the communication link for communication between the client device and the server supports a minimum quality, latency, or capacity level. The apparatus may also include means for measuring at least one of the quality, latency, or capacity of the communication link for communication between the client device and the server.

The subject matter described herein can be implemented to realize one or more benefits or advantages. For instance, the described graphics processing techniques can be used by a server, a client, a GPU, a CPU, or some other processor that can perform computer or graphics processing to implement the split rendering techniques described herein. This can also be accomplished at a low cost compared to other computer or graphics processing techniques. Moreover, the computer or graphics processing techniques herein can improve or speed up data processing or execution. Further, the computer or graphics processing techniques herein can improve resource or data utilization and/or resource efficiency. Additionally, aspects of the present disclosure can utilize a split rendering process that can reduce the amount of power utilized and still maintain a high level of rendering quality.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus for computer processing at a client device, comprising:
   a memory; and
   at least one processor coupled to the memory and configured to:
      obtain an indication of at least one of a quality, latency, or capacity of a communication link for communication between the client device and a server;
      determine a computational load at the client device for a computation of an application, wherein the computation of the application is associated with at least one of the client device or the server; and
      select a computational distribution for the computation of the application between the client device and the server based on at least one of the computational load at the client device for the computation of the application or at least one of the quality, latency, or capacity of the communication link,
      wherein the client device performs a first client level of the computation of the application and the server performs a first server level of the computation of the application if the determined computational load for the computation of the application is less than a computational load threshold.

2. The apparatus of claim 1, wherein the at least one processor is further configured to:
   determine a computational capacity of the client device.

3. The apparatus of claim 2, wherein to determine the computational capacity of the client device, the at least one processor is configured to:
   determine a thermal threshold level of the client device;
   determine a computational power level of the client device, wherein the computational power level of the client device includes a remaining battery level; or
   determine whether at least one of the client device or the server supports a minimum computational capacity.

4. The apparatus of claim 2, wherein the computational distribution for the computation of the application between the client device and the server is selected based on the computational capacity of the client device.

5. The apparatus of claim 2, wherein the computational capacity of the client device is a rendering computational capacity.

6. The apparatus of claim 1, wherein to obtain the indication of at least one of the quality, latency, or capacity of the communication link, the at least one processor is configured to:
   obtain a first indication of whether the communication link for the communication between the client device and the server supports a minimum quality, latency, or capacity level.

7. The apparatus of claim 1, wherein the at least one processor is further configured to:
   obtain a measurement of at least one of the quality, latency, or capacity of the communication link for the communication between the client device and the server.

8. The apparatus of claim 1, wherein the client device performs a second client level of the computation of the application and the server performs a second server level of the computation of the application if the determined computational load for the computation of the application is greater than or equal to a computational load threshold.

9. The apparatus of claim 1, wherein the computational distribution for the computation of the application between the client device and the server corresponds to a split extended reality (XR) architecture, a split augmented reality (AR) architecture, or a split virtual reality (VR) architecture.

10. The apparatus of claim 1, wherein the server is an edge server or a cloud server, and wherein the client device is a head mounted display (HMD) or a headset.

11. The apparatus of claim 1, wherein the computational distribution for the computation of the application between the client device and the server is selected by a central processing unit (CPU) or a graphics processing unit (GPU) at the client device.

12. The apparatus of claim 1, wherein the quality, latency, or capacity of the communication link is based on a quality of service (QOS) notification message, wherein the computational distribution is selected based on the QoS notification message, and wherein a time period of adjustment of the computational distribution is based on the QoS notification message.

13. The apparatus of claim 1, wherein the computation of the application is associated with one or more multimedia applications, wherein the one or more multimedia applications include at least one of one or more extended reality (XR) applications, one or more augmented reality (AR) applications, one or more virtual reality (VR) applications, one or more cloud gaming applications, or one or more cloud assisted perception applications.

14. An apparatus for computer processing at a server, comprising:
   a memory; and
   at least one processor coupled to the memory and configured to:
      obtain an indication of at least one of a quality, latency, or capacity of a communication link for communication between a client device and the server;
      determine a computational load at the server for a computation of an application, wherein the computation of the application is associated with at least one of the client device or the server; and
      select a computational distribution for the computation of the application between the client device and the server based on at least one of the computational load at the server for the computation of the application or at least one of the quality, latency, or capacity of the communication link,
      wherein the client device performs a first client level of the computation of the application and the server performs a first server level of the computation of the application if the determined computational load for the computation of the application is less than a computational load threshold.

15. The apparatus of claim 14, wherein the at least one processor is further configured to:
determine a computational capacity of the server.

16. The apparatus of claim 15, wherein to determine the computational capacity of the server, the at least one processor is configured to:
determine a thermal threshold level of the server;
determine a computational power level of the server; or
determine whether at least one of the client device or the server supports a minimum computational capacity.

17. The apparatus of claim 15, wherein the computational distribution for the computation of the application between the client device and the server is selected based on the computational capacity of the server.

18. The apparatus of claim 15, wherein the computational capacity of the server is a rendering computational capacity.

19. The apparatus of claim 14, wherein to obtain the indication of at least one of the quality, latency, or capacity of the communication link, the at least one processor is configured to:
obtain a first indication of whether the communication link for the communication between the client device and the server supports a minimum quality, latency, or capacity level.

20. The apparatus of claim 14, wherein the at least one processor is further configured to:
obtain a measurement of at least one of the quality, latency, or capacity of the communication link for the communication between the client device and the server.

21. The apparatus of claim 14, wherein the client device performs a second client level of the computation of the application and the server performs a second server level of the computation of the application if the determined computational load for the computation of the application is greater than or equal to a computational load threshold.

22. The apparatus of claim 14, wherein the computational distribution for the computation of the application between the client device and the server corresponds to a split extended reality (XR) architecture, a split augmented reality (AR) architecture, or a split virtual reality (VR) architecture.

23. The apparatus of claim 14, wherein the server is an edge server or a cloud server, and wherein the client device is a head mounted display (HMD) or a headset.

24. The apparatus of claim 14, wherein the computational distribution for the computation of the application between the client device and the server is selected by a central processing unit (CPU) or a graphics processing unit (GPU) at the server.

25. The apparatus of claim 14, wherein the quality, latency, or capacity of the communication link is based on a quality of service (QOS) notification message, wherein the computational distribution is selected based on the QoS notification message, and wherein a time period of adjustment of the computational distribution is based on the QoS notification message.

26. The apparatus of claim 14, wherein the computation of the application is associated with one or more multimedia applications, wherein the one or more multimedia applications include at least one of one or more extended reality (XR) applications, one or more augmented reality (AR) applications, one or more virtual reality (VR) applications, one or more cloud gaming applications, or one or more cloud assisted perception applications.

* * * * *